Feb. 21, 1950          H. C. SOMMER          2,498,304
AUTOMOBILE HOIST
Filed April 8, 1947          5 Sheets-Sheet 1
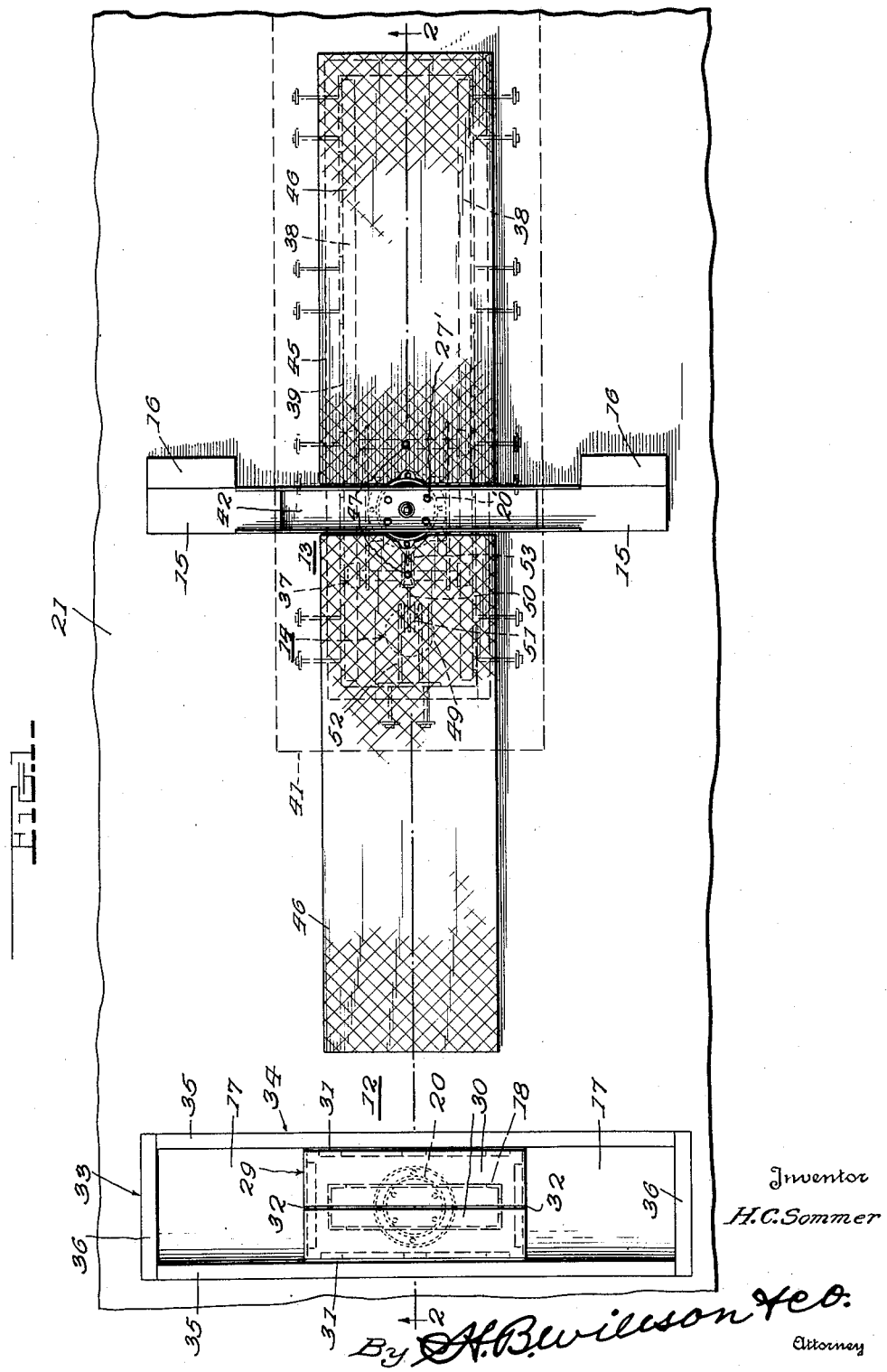
Inventor
H. C. Sommer

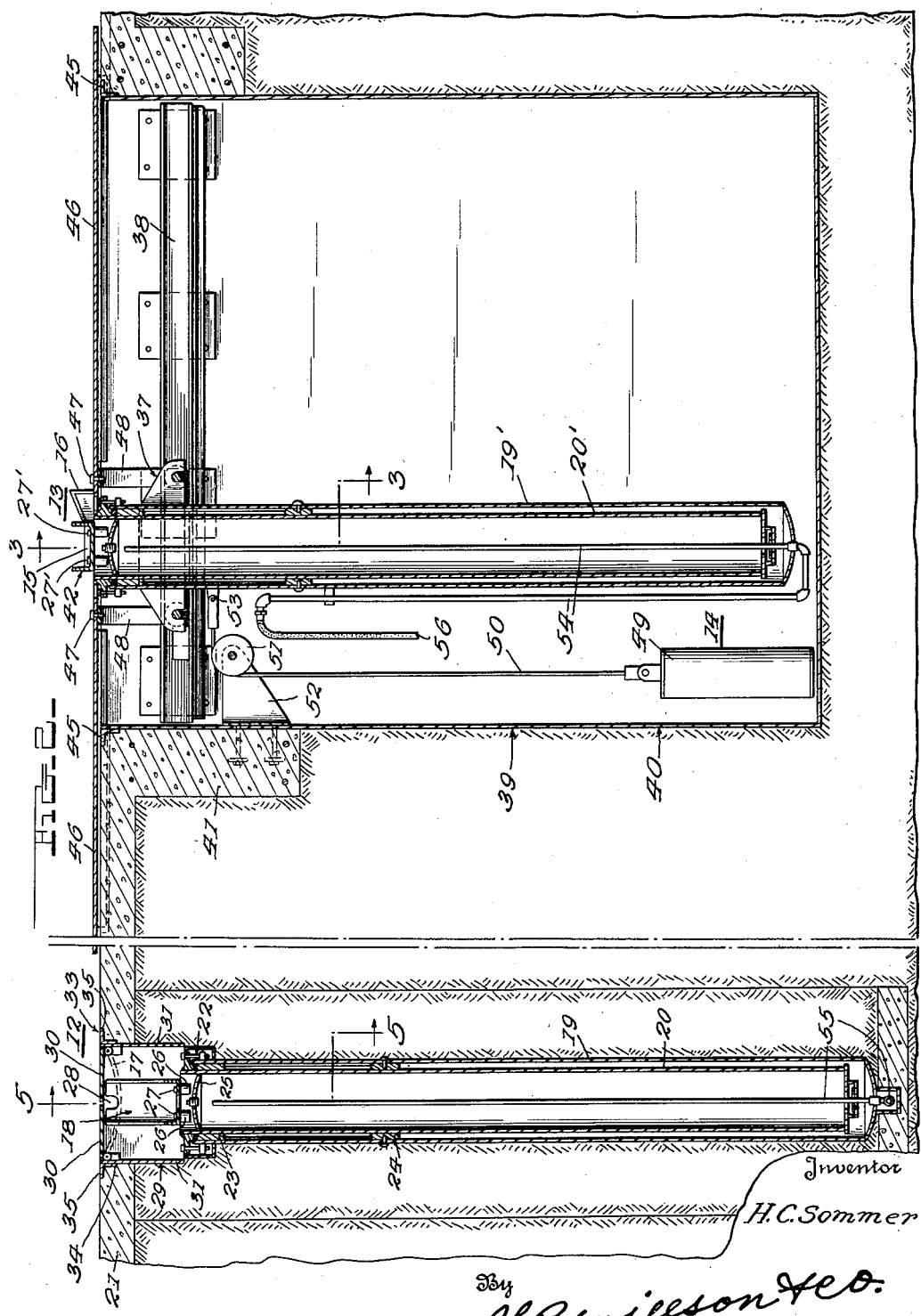

Feb. 21, 1950  H. C. SOMMER  2,498,304
AUTOMOBILE HOIST
Filed April 8, 1947  5 Sheets-Sheet 3
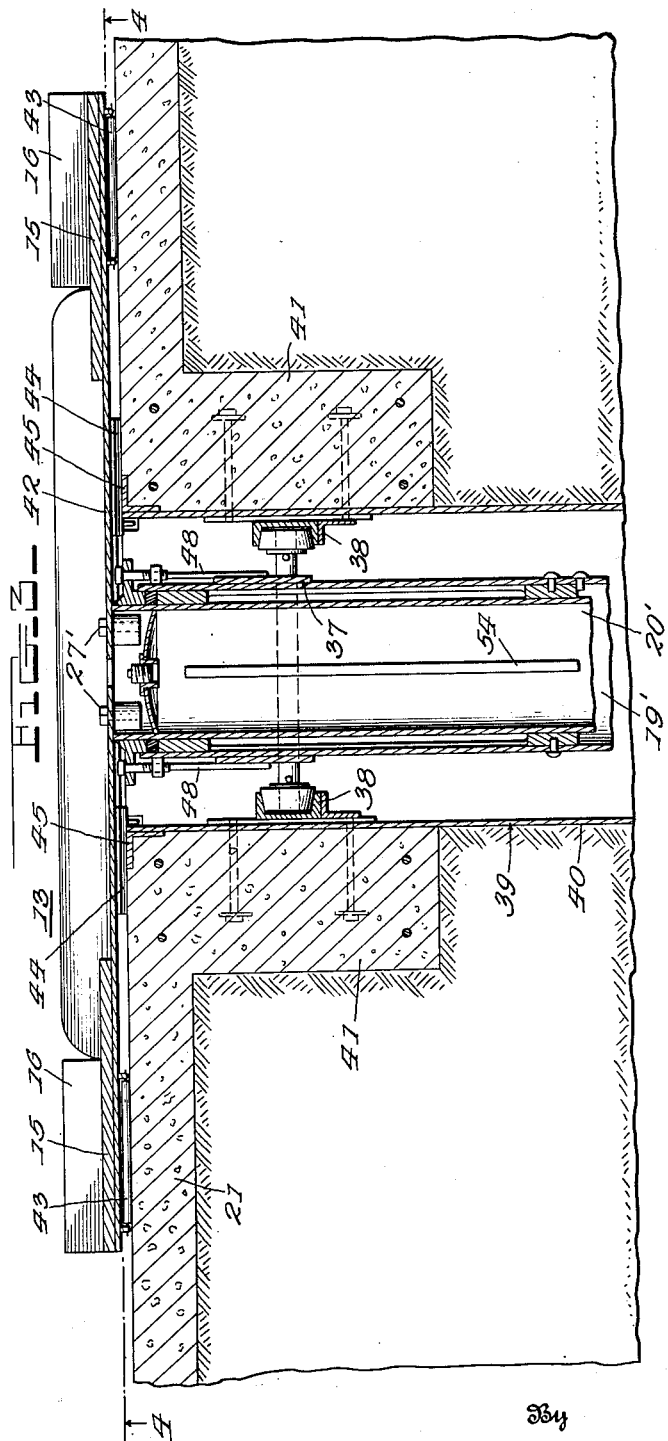
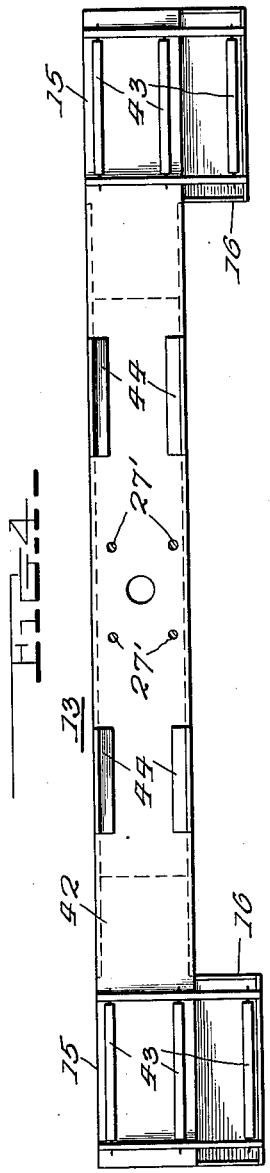
Inventor
H. C. Sommer
By H. B. Willson & Co.
Attorney

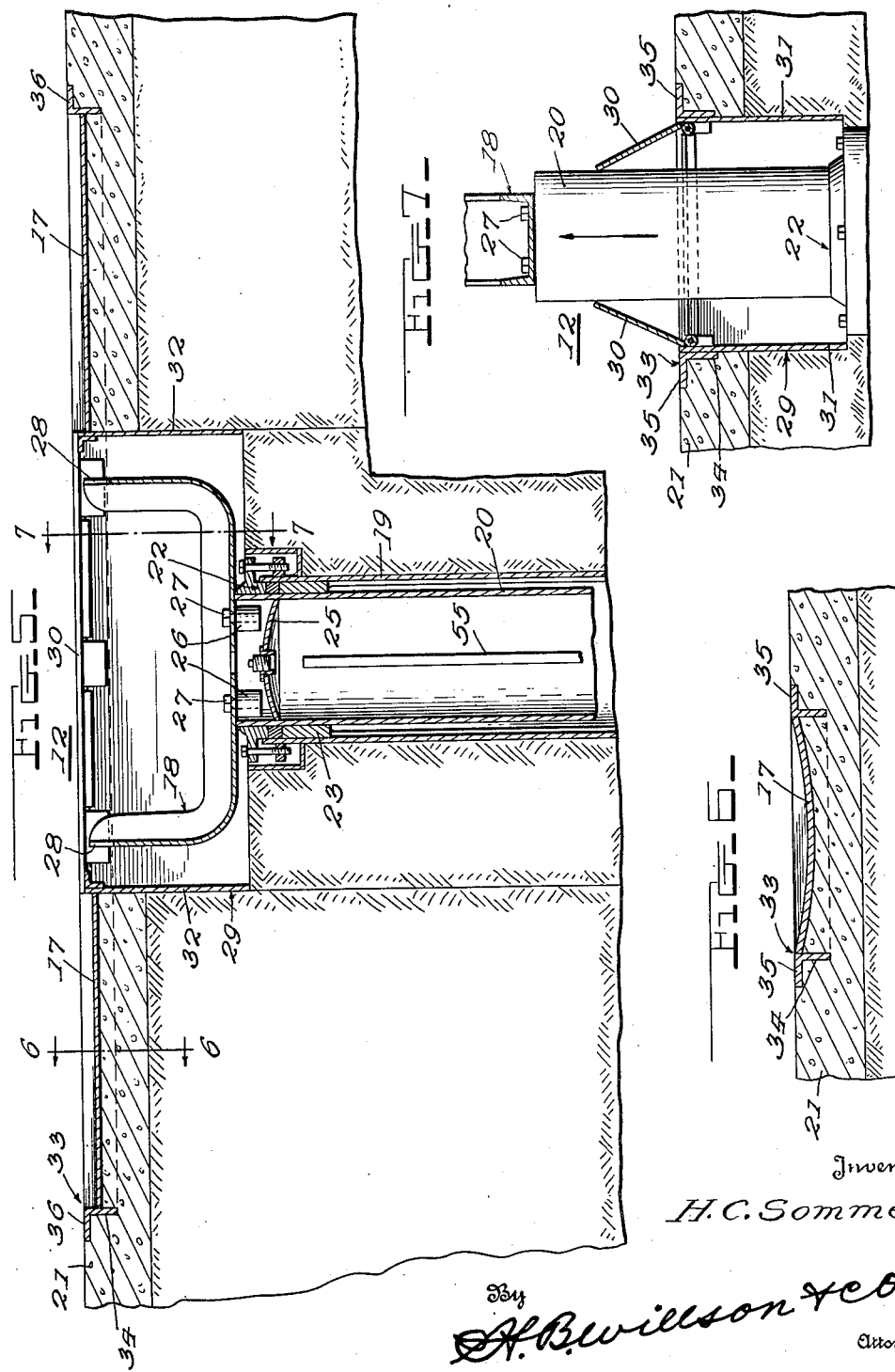

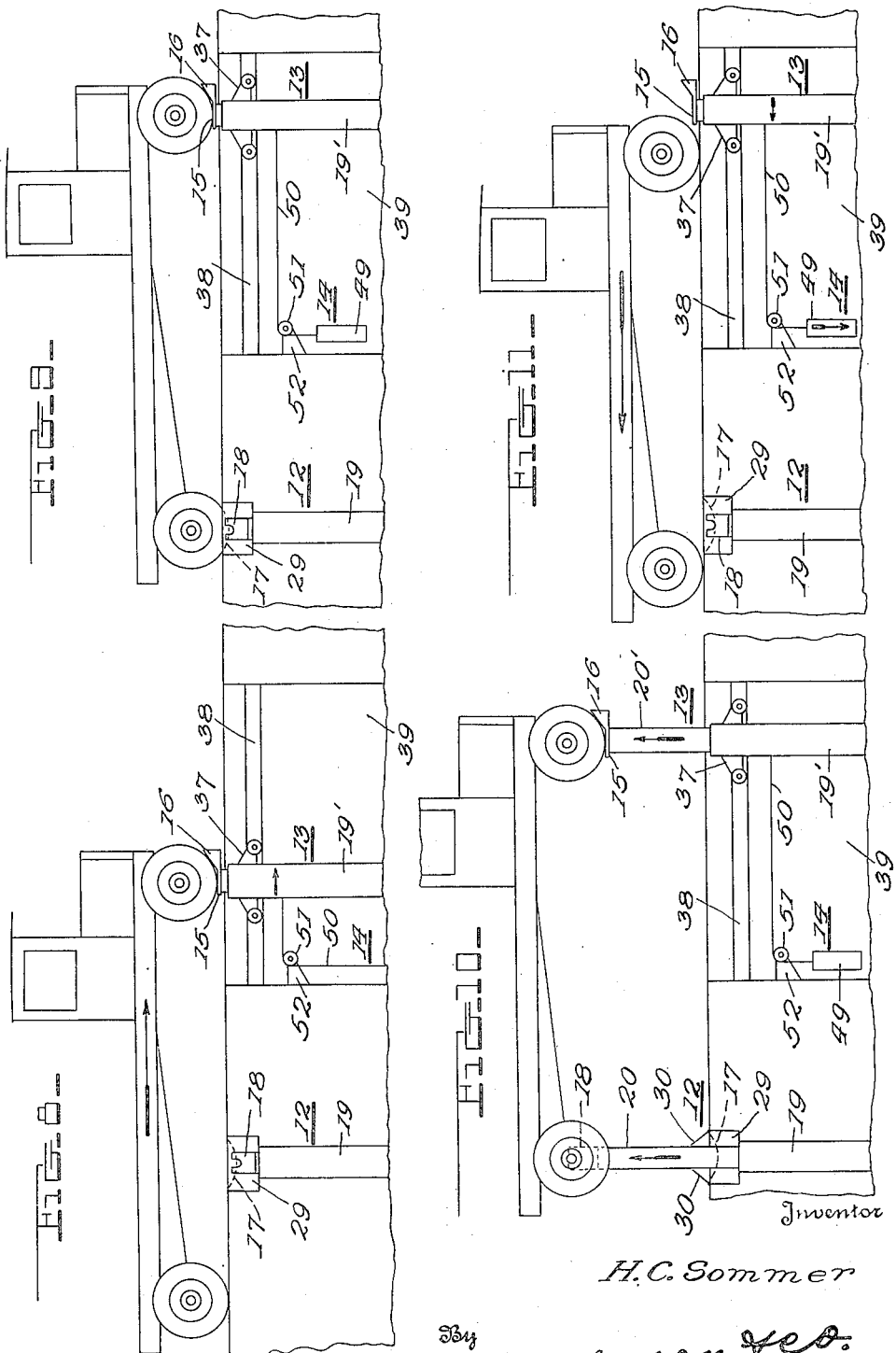

Patented Feb. 21, 1950

2,498,304

UNITED STATES PATENT OFFICE 2,498,304

AUTOMOBILE HOIST

Herman C. Sommer, Lynwood, Calif.

Application April 8, 1947, Serial No. 740,192

7 Claims. (Cl. 254—89)

1

The invention relates to an automobile hoist of the drive-on type in which a front hoisting means is shiftable forwardly and rearwardly with respect to a rear hoisting means to adjust the hoist to cars having wheel bases of different lengths.

The principal object of the invention is to provide a new and improved hoist of the general type above set forth which will be automatically adjusted to the length of any car driven onto it, and will, upon backing of the car from it, be automatically re-set in readiness for reception of the next car.

Another object is to provide novel lifting means for the front of the car, including front wheel supports having chocks against which the front wheels push when driving a car onto the hoist, the pushing of the wheels against said chocks serving to forwardly shift the front hoisting means to adjust the hoist to the length of the car.

Depressed wheel seats are provided into which the rear wheels of the car drop to position the rear axle in proper relation with the rear hoisting means when the front hoisting means has been pushed sufficiently forward; and a further object is to provide a novel assemblage including a single horizontal frame which carries said depressed seats and also carries a housing which normally receives the rear-axle-engaging member of said rear hoisting means.

A still further object is to make novel provision for connecting car-lifting members with the plungers of front and rear cylinder-and-plunger-assemblies.

Yet another object is to provide a hoist which will be rather simple and inexpensive, yet will be efficient, reliable, safe and durable.

Fig. 1 of the accompanying drawings is a top plan view of the hoist.

Fig. 2 is a vertical longitudinal sectional view on line 2—2 of Fig. 1.

Fig. 3 is an enlarged vertical transverse sectional view on line 3—3 of Fig. 2.

Fig. 4 is a horizontal sectional view on line 4—4 of Fig. 3.

Fig. 5 is an enlarged vertical transverse sectional view on line 5—5 of Fig. 2.

Figs. 6 and 7 are detail vertical sectional views on lines 6—6 and 7—7 of Fig. 5.

Figs. 8, 9, 10 and 11 are sequential operational diagrams.

A preferred construction has been illustrated in the drawings and will be rather specifically described but numerous variations may be made within the scope of the invention as claimed.

In general

A rear hoisting means 12 is provided to engage the rear axle of a motor vehicle; and a front hoisting means 13 is employed to engage the front wheels of the vehicle. The front hoisting means 13 is mounted for movement forwardly and rearwardly with respect to the rear hoisting means 12; and means 14 is provided to normally hold said front hoisting means 13 yieldably at its rearmost position as seen in Figs 1 and 2, in which position, it is spaced from the rear hoisting means 12 a distance no greater than the wheel base length of the shortest standard-width cars now manufactured. This front hoisting means 13 includes supports 15 for the front wheels of any car to be lifted, and also includes front wheel chocks 16 which limit the forward driving of the car onto said supports 15. Thus, when any car except one having a wheel base length agreeing with the spacing of the front and rear hoisting means, is driven onto the hoist, the front wheels of the car will push against the chocks 16 (see Fig. 8) and will forwardly push the front hoisting means 13 to adjust the length of the hoist to the length of the car wheel base. Two depressed wheel seats 17 are provided into which the rear wheels of the car drop when this length-adjustment of the hoist has been completed (see Fig. 9); and the rear hoisting means 12 includes axle-engaging means 18 over which the rear axle of the car comes to rest when said rear wheels drop into said depressed seats 17 (again see Fig. 9). The rear and front hoisting means 12 and 13 may then be operated to lift the car for servicing or repair (Fig. 10) and to again lower said car. The lowered car is then backed off the hoist (Fig. 11), and during this backing, the means 14 returns the front hoisting means 13 to its rearmost position, automatically re-setting the hoist for reception of the next car.

Rear hoisting means 12 (see Figs. 1, 2, 5, 6, and 7)

The rear hoisting means 12 includes a hydro-pneumatic cylinder-and-plunger-assembly, the cylinder and plunger of which are denoted at 19 and 20 respectively. The cylinder 19 is set solidly in the ground under a concrete floor or slab 21 and is provided at its upper end with suitable packing means 22 through which the plunger 20 extends. This plunger 20 is guided by upper and lower bearings 23 and 24 suitably secured in the cylinder 19; said plunger is of tubular form; and it is provided near its upper end with a head 25. The tubular side wall of this plunger, above the head 25, carries internal lugs 26 into which capscrews 27 are threaded to secure the axle-engaging means 18 of said plunger, said means 18 being preferably in the form of a U-shaped channel bar having notches 28 in its ends. This axle-engaging means is normally housed in a rectangular casing 29 having hinged upwardly swingable doors 30 which are opened (Fig. 7) by ascent of the plunger 20 and are closed by gravity upon plunger descent. The casing 29 includes parallel vertical side walls 31 and end walls 32 but need have no bottom other than that formed by the hard-packed earth around the cylinder 19.

A single horizontal, rectangular, angle-metal frame 33 is set in a slot 34 in the floor or slab 21, and the intermediate portion of this frame receives the casing 29, the side walls 31 of said casing being welded or otherwise secured to the side bars 35 of said frame. The end bars 36 of the frame 33 are spaced outwardly from the end walls 32 of the casing 29, and the rear wheel seats 17 are located between said end bars 36 and end walls 32 and between the side bars 35. These seats 17 are in the form of transversely concave rectangular plates welded or otherwise secured to the parts 32, 36 and 35. Thus, the frame 33, casing 29 and seats 17, form a single rigid unit which facilitates manufacture and installation.

*Front hoisting means 13 (see Figs. 1, 2, 3 and 4)*

The front hoisting means 13 includes a hydropneumatic cylinder-and-plunger-assembly 19'—20' which is substantially a duplicate of the rear assembly 19—20, the cylinder 19', however, being mounted on a wheeled carriage 37 which is supported by suitably mounted tracks 38 in a casing 39, this casing being set in a pit 40 in the ground and being surrounded by and secured to a downward extension 41 of the floor or slab 21. A lifting beam 42 is secured at 27' upon the upper end of the plunger 20', the securing being accomplished in the same manner as followed in attaching the axle-engaging means 18 to the plunger 20, above described. The beam 42 is in the form of an upwardly open channel which carries the front wheel supports 15; and said supports are preferably rectangular plates welded or otherwise secured to the ends of said channel. The chocks 16 may well be formed from welded-together sections and these chocks are welded or otherwise secured to the front edges of the front-wheel supports 15. The lower sides of these supports 15 are provided with suitable rollers 43 which normally rest upon the floor or slab 21, and the lower side of the beam 42 may well carry angle-metal cleats 44 normally resting slidably upon the side bars of a horizontal frame 45 at the upper end of the casing 39.

Slidable cover plates 46 are provided for the casing 39, said plates being connected with a suitable part of the forwardly and rearwardly shiftable front hoisting means to move therewith. For illustrative purposes, these plates have been secured by cap screws 47 to arched bars 48 welded or otherwise fastened to the carriage 37.

*Yieldable holding and resetting means 14 (see Fig. 2)*

The means 14 for normally yieldably holding the front hoisting means 13 in its rearmost position and for resetting said hoisting means at said rearmost position after use of the hoist, preferably comprises a weight 49, cable 50 and sheave 51. The sheave 51 is mounted on a bracket 52 in the rear end of the casing 39; the cable 50 is trained over this sheave and is connected at 53 with the cylinder 19' or other suitable part; and said cable depends from said sheave 51 to the weight 49, to which it is secured.

Air under pressure for moving a hydraulic fluid in the front and rear cylinder-and-plunger-assemblies, to actuate said assemblies, may be conducted in any appropriate way. Lines 54 and 55 have been shown, and the line 54 may well include a hose 56 to prevent injury as the front hoisting means moves forwardly and rearwardly.

*Operation (see Figs. 1, 2 and 8 to 11)*

The parts normally stand as seen in Figs. 1 and 2. Thus, when a car is driven onto the hoist (Fig. 8), its front wheels will roll onto the front wheel supports 15 and will push against the chocks 16, thereby pushing the front hoisting means 13 forwardly (Fig. 9) until the rear wheels drop into the depressed seats 17. The rear and front hoisting means 12 and 13 are then operated to lift the car (Fig. 10); and when said car is again lowered, it is backed-off (Fig. 11). During this car-backing operation, the means 14 functions to return the front hoisting means 13 to its rearmost position, automatically resetting the hoist for the next car.

From the foregoing, it will be seen that novel and advantageous provision has been made for attaining the desired ends, and while preferences have been disclosed, attention is again invited to the possibility of making variations within the scope of the invention as claimed.

What is claimed is:

1. A drive-on automobile hoist comprising a rear hoisting means, a front hoisting means mounted for forward and rearward movement with respect to said rear hoisting means and normally occupying its rearmost position, said front hoisting means including front wheel supports having chocks to limit forward rolling of the front wheels of an automobile onto said supports; whereby, when the front wheels of an automobile are forwardly driven onto said wheel supports against said chocks, further forward driving of the automobile will cause it to forwardly push said front hoisting means; rear-wheel-engaging means for determining when the rear of the automobile has arrived at proper position to be engaged by said rear hoisting means; and self-acting returning means for said front hoisting means, said self-acting returning means being connected with said front hoisting means and being constructed and arranged to automatically return the latter to said rearmost position upon driving of the automobile from the hoist; whereby the hoist will be automatically re-set for the next automobile.

2. A drive-on automobile hoist comprising a rear hoisting means, a front hoisting means mounted for forward and rearward movement with respect to said rear hoisting means and normally occupying its rearmost position, said front hoisting means including front wheel supports having chocks to limit forward rolling of the front wheels of an automobile onto said supports; whereby, when the front wheels of an automobile are forwardly driven onto said wheel supports against said chocks, further forward driving of the automobile will cause it to forwardly push said front hoisting means; rear-wheel-engaging means for determining when the rear of the automobile has arrived at proper position to be engaged by said rear hoisting means; a cable so connected with said front hoisting means as to be pulled as this hoisting means is pushed forwardly, said cable having a portion which ascends as said cable is pulled, and a weight connected with said cable portion, said weight and cable being effective to automatically return said front hoisting means to said rearmost position upon driving of the automobile from the hoist; whereby the hoist will be automatically re-set for the next automobile.

3. A drive-on automobile hoist comprising a rear hoisting means, a front hoisting means including a cylinder-and-plunger-assembly, and a lifting beam on the plunger thereof, the ends of said beam having wheel supports onto which to drive the front wheels of an automobile and also having chocks to limit the movement of the wheels onto said supports; a casing into which said cylinder-and-plunger-assembly extends, a supporting carriage secured to the cylinder of said assembly, and tracks in said casing supporting said carriage for forward and rearward movement, said carriage normally occupying its rearmost position; whereby, when the front wheels of an automobile are forwardly driven onto said wheel supports against said chocks, further forward driving of the automobile will cause it to forwardly push said front hoisting means; rear-wheel-engaging means for determining when the rear of the automobile has arrived at the proper position to be engaged by said rear hoisting means, and self-acting returning means for said front hoisting means, said self-acting means being confined within said casing and being constructed and arranged to automatically return said front hoisting means to said rearmost position upon driving of the automobile from the hoist, whereby the hoist will be automatically re-set for the next automobile.

4. In a drive-on automobile hoist, a carriage and horizontal tracks therefor, a vertical cylinder secured to said carriage, a fluid-actuated plunger in said cylinder and extending through the upper end thereof, a horizontal beam secured centrally between its ends to the upper end of said plunger, said ends of said beam having flat, substantially rectangular wheel supports onto which wheels of an automobile may be driven, and wheel chocks fixed to one edge of said wheel supports for limiting the extent to which the automobile wheels may be driven onto said wheel supports, whereby pushing of the front wheels against said chocks, will forwardly shift said carriage and all parts carried thereby.

5. In a drive-on automobile hoist, a carriage and horizontal tracks therefor, a vertical cylinder secured to said carriage, a fluid-actuated plunger in said cylinder and extending through the upper end thereof, a horizontal channel beam secured centrally between its ends to the upper end of said plunger, said beam having a bottom plate and longitudinal flanges projecting upwardly from said bottom plate and of less length than the latter, two horizontal rectangular wheel-supporting plates secured upon the end portions of said bottom plate and projecting beyond the ends of said flanges, the portions of two plates beyond said flanges constituting supports onto which wheels of an automobile may be driven, and wheel chocks secured along the forward edges of said two plates beyond said flanges for limiting the extent to which the automobile wheels may be driven onto said wheel supports, whereby pushing of the front wheels against said chocks, will shift said carriage and all parts carried thereby.

6. In an automobile hoist, a floor having an elongated rectangular slot, a rectangular frame secured within said slot and having parallel side bars and parallel end bars, a casing secured to said side bars between the ends of said frame and having two parallel vertical end walls extending transversely between said side bars, said casing end walls being spaced inwardly from said end bars, two wheel-supporting plates extending from said casing end walls to said end bars and from one of said side bars to the other, said wheel-supporting plates being secured to said end walls and to said side and end bars and being concave transversely of the length of said frame, and lifting means including an axle-engaging member normally confined within said casing but projectable upwardly therefrom to engage an axle when the wheels of the latter rest upon said wheel-supporting plates.

7. A drive-on automobile hoist comprising a rear hoisting means, a front hoisting means mounted for forward and rearward movement with respect to said rear hoisting means and normally occupying its rearmost position, said front hoisting means including means engageable by the front wheels of an automobile and to be pushed by the wheels to move said front hoisting means forwardly away from said rear hoisting means, rear-wheel-engaging means for determining when the rear of the automobile has arrived at proper position to be engaged by said rear hoisting means, means for actuating said front and rear hoisting means to lift an automobile positioned over them, and self-acting returning means for said front hoisting means, said self-acting returning means being connected with said front hoisting means and being constructed and arranged to automatically return the latter to said rearmost position upon driving of the automobile from the hoist, whereby the hoist will be automatically reset for the next automobile.

HERMAN C. SOMMER.

REFERENCES CITED

The following references are of record in the file of this patent:

UNITED STATES PATENTS

| Number | Name | Date |
| --- | --- | --- |
| 1,849,777 | Weaver | Mar. 15, 1932 |
| 2,015,357 | Weaver | Sept. 24, 1935 |
| 2,199,524 | Kroll | May 7, 1940 |
| 2,231,362 | Kroll | Feb. 11, 1941 |
| 2,285,989 | Kroll | June 9, 1942 |